US007848328B2

(12) United States Patent
Vare et al.

(10) Patent No.: US 7,848,328 B2
(45) Date of Patent: Dec. 7, 2010

(54) BROADCAST CONTENT ENCAPSULATION

(75) Inventors: Jani Petteri Vare, Kaarina (FI); Harri J. Pekonen, Raisio (FI); Jyrki Tapio Alamaunu, Turku (FI)

(73) Assignee: Nokia Corporation, Espoo (FI)

( * ) Notice: Subject to any disclaimer, the term of this patent is extended or adjusted under 35 U.S.C. 154(b) by 111 days.

(21) Appl. No.: 12/167,412

(22) Filed: Jul. 3, 2008

(65) Prior Publication Data

US 2010/0002696 A1 Jan. 7, 2010

(51) Int. Cl.
*H04J 3/24* (2006.01)

(52) U.S. Cl. ..................... 370/392; 370/474

(58) Field of Classification Search ............ None
See application file for complete search history.

(56) References Cited

U.S. PATENT DOCUMENTS

| | | | | |
|---|---|---|---|---|
| 6,970,127 | B2 * | 11/2005 | Rakib | 341/173 |
| 7,227,899 | B2 * | 6/2007 | Balakrishnan et al. | 375/240.26 |
| 7,590,991 | B2 * | 9/2009 | Arad et al. | 725/15 |
| 2004/0230695 | A1 * | 11/2004 | Anschutz et al. | 709/232 |
| 2005/0122976 | A1 * | 6/2005 | Poli et al. | 370/392 |
| 2005/0166244 | A1 | 7/2005 | Moon | |
| 2006/0062200 | A1 | 3/2006 | Wang et al. | |
| 2008/0022321 | A1 | 1/2008 | Ver Steeg et al. | |

FOREIGN PATENT DOCUMENTS

GB 2408433 5/2005

WO 0115455 3/2001

OTHER PUBLICATIONS

"Generic Stream"Generic Stream Encapsulation (GSE) Protocol, DVB Document A116 (May 2007).
Draft ETSI EN 302 755 v1.1.1 ("Digital Video Broadcasting (DVB); Frame structure channel coding and modulation for a second generation digital terrestrial television broadcasting system (DVB-T2)")(Apr. 2008).
Final Draft ETSI EN 300 468 v1.8.1 ("Digital Video Broadcasting (DVB); Specification for Service Information (SI) in DVB systems")(Oct. 2007).
ETSI EN 301 958 v1.1.1 ("Digital Video Broadcasting (DVB); Interaction channel for Digital Terrestrial Television (RCT) incorporating Multiple Access OFDM")(Mar. 2002).
ETS 300 801 ("Digital Video Broadcasting (DVB); Interaction channel through Public Switched Telecommunications Network (PSTN)/Integrated Services Digital Networks (ISDN)")(Aug. 1997).

(Continued)

*Primary Examiner*—Steven H Nguyen
*Assistant Examiner*—Alex Skripnikov
(74) *Attorney, Agent, or Firm*—Banner & Witcoff, Ltd.

(57) ABSTRACT

Components of a transmitted service delivering multiple versions of content are mapped to streams carrying data for those multiple versions. The data streams are encapsulated into User Datagram Protocol (UDP) packets; the UDP destination port fields of the packets are given component-identifying values. A user equipment (UE) receiving the transmitted service identifies desired components based on the UDP destination port field values. The UE further encapsulates desired component UDP packets into Internet Protocol (IP) packets, and may assign component-identifying values to fields of the IP packets (e.g., the IP source address and/or IP destination address).

28 Claims, 15 Drawing Sheets

OTHER PUBLICATIONS

Internet Engineering Task Force RFC 768 ("User Datagram Protocol")(Aug. 28, 1980).
Internet Engineering Task Force RFC 791 ("Internet Protocol")(Sep. 1981).
Internet Engineering Task Force RFC 2460 ("Internet Protocol, version 6 (IPv6)")(Dec. 1998).

EN 301 195 v1.1.1 ("Digital Video Broadcasting (DVB); Interaction channel through the Global System for Mobile communications (GSM)")(Feb. 1999).
International Search Report and Written Opinion for PCT/FI2009/050551 dated Oct. 20, 2009.

* cited by examiner

BROADCAST CONTENT ENCAPSULATION

BACKGROUND

When broadcasting a specific item of content to a diverse population of wireless devices, it may be useful to broadcast, multicast and/or unicast multiple versions of that specific content. As but one example, a specific content item may be a program having audio and/or visual elements that can be encoded using any of variety of different types of coder/decoder software (CODEC), including scalable CODECs. Because numerous different CODECs may be deployed in the population of wireless devices that may be used to receive the specific content item, it is desirable to transmit that content in such a manner so as to make separate CODEC-specific versions available. If multiple versions of the same content are to be broadcast, multicast and/or unicast, it would be useful to have some mechanism for identifying data streams corresponding to the different versions of that content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, data streams related to a specific content are mapped to components of a transmission service that delivers multiple versions of that specific content. Such content may include audio data, video data and/or other types of data, some or all of which may be any combination of real-time and non-real-time data. For example, versions of the content may vary based on a CODEC used to encode media for the content, based on transmission parameters (e.g., bit rate) for a data stream providing such media, based on a language for subtitles or other text associated with the specific content, based on other types of data associated with the content, etc. The data stream for each component is encapsulated into packets according to a communication protocol such as, e.g., User Datagram Protocol (UDP). A common field of each packet header, which in some embodiments is the UDP destination port field, is given a value identifying the corresponding component. A user equipment (UE) receiving a transmission of the service identifies desired components based on the common field values.

In some embodiments, components are also assigned identifying values according to a second communication protocol, which in some embodiments may be Internet Protocol (IP). However, data streams for each component are not encapsulated according to the second protocol. After a UE receiving a broadcast, multicast or unicast of the service identifies the first protocol packets corresponding to desired components, the UE then encapsulates the identified first protocol packets in second protocol packets and includes the assigned identifying values in the second protocol packets.

BRIEF DESCRIPTION OF THE DRAWINGS

Some embodiments of the present invention are illustrated by way of example, and not by way of limitation, in the figures of the accompanying drawings and in which like reference numerals refer to similar elements.

DETAILED DESCRIPTION

Figure 1:
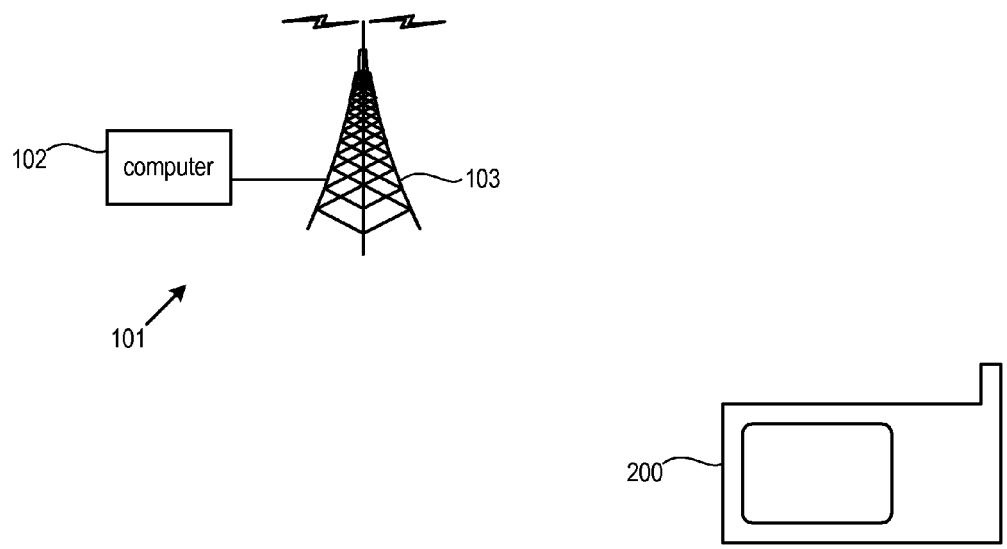
FIG. 1 is a block diagram showing one example of a network environment in which at least some embodiments may be employed.

FIG. 1 is a block diagram showing one example of a communication network environment in which at least some embodiments may be employed. In the example of FIG. 1, a network service provider 101 includes a computer 102 and transmission facilities 103 for communication of services and other data to user equipment (UE) 200. UE 200 may be any of various types of devices, including but not limited to a handheld mobile terminal having two-way wireless communication capability, a smart phone, a personal digital assistant (PDA), etc. Further details of UE 200 and examples of other types of UEs are provided herein.

Figure 2:
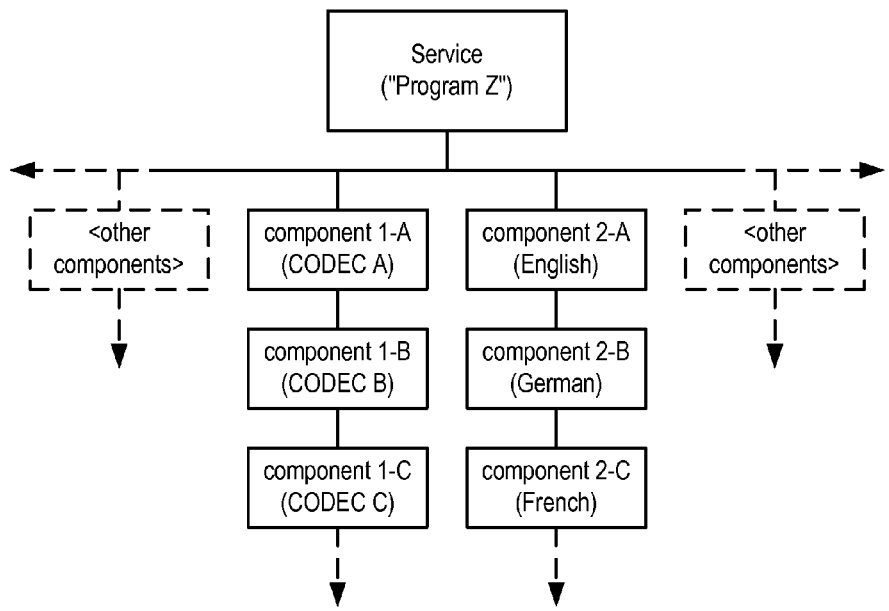
FIG. 2 is a block diagram showing a relationship between services and components.

Services, as used herein, include but are not limited to broadcast, multicast and unicast communications having video and/or audio elements. One non-limiting example of such a service having video and/or audio elements is a television program. A service may include multiple associated components. Components can be used to offer multiple versions of a specific item of content being delivered by a service, and a UE receiving that service will not necessarily utilize all of those components. FIG. 2 is a block diagram showing an example of this concept. The service in the example of FIG. 2 is a specific broadcast television program called "Program Z" for purposes of illustration. Component 1-A is an audio and video media stream for Program Z that has been encoded using a particular type of CODEC (coder/decoder). For simplicity, this is shown generically in FIG. 2 as "CODEC A." Component 1-B is the same audio and video stream, but encoded with CODEC B. Component 1-C is the same stream, but encoded with CODEC C. One or more of the CODECs can be a scalable CODEC. Component 2-A is a stream of textual information, to be overlaid on the video, in a first language (English). Component 2-B is a stream of textual information in German, and component 2-C is a stream of textual information in French. As explained in further detail below, each component represents a stream of data packets that are transmitted by service provider 101 in a particular physical layer pipe (PLP). In at least some embodiments, a PLP represents a particular set of time slots in one or more specific frequency sub-bands. A UE equipped with CODEC B and operated by a person watching Program Z with German text would process components 1-B and 2-A. A UE equipped with CODEC C and operated by a person watching the same show with French text would process components 1-C and 2-C.

The components shown in FIG. 2 are merely some possible examples. Numerous other types of data can be contained in service components. As but one example, audio and video could be transmitted in separate streams. Separate components could represent audio streams dubbed in different languages or combined audio and visual streams dubbed in different languages. Other types of data that could form different components associated with a service include but are not limited to higher or lower resolution versions of the same media, telemetry associated with events shown in a video broadcast, etc. As but one further illustration, a particular service may be available at a variety of bit rates so as to accommodate a hierarchical content coding scheme. This could be achieved, for example, using scalable CODECs. A baseline stream might be offered, at a low bit rate, and made available to all terminals. Higher bit rate streams offering higher audio and/or video quality could then be offered, perhaps for an increased fee. A service need not be a television program. Additional examples of services include file delivery, software programs, and other types of information that can be consumed by a multimedia-capable handheld computer or other type of UE.

Notably, and as discussed below, a component could be associated with more than one service. Several services might use the same components, even when those services are delivered by different service providers. As but one illustration, several services might offer coverage of the same sporting event. Each of those services might use the same live video feed from a stadium or other venue hosting the event, but may have different audio, subtitles, rich media, graphics and/or other types of media. Several of the services may thus be mapped to a common component for the live video feed, but be mapped to service-specific components for other media.

UE 200 includes elements that operate as a receiver module and elements that operate as a terminal module. The same physical elements may perform both receiver and terminal functions. For example, a microprocessor could simultaneously execute receiver- and terminal-related programming operations in separate threads. The UE receiver module detects components in, and extracts those components from, a received transmission, decodes and decapsulates the components, and in some embodiments re-encapsulates those components before forwarding them to the terminal module. The terminal module receives components and makes them available to one or more appropriate applications being executed by the terminal module or elsewhere. An appropriate application could be, for example, a media player. The terminal module may also forward components to other devices via a wireless local area network (WLAN) and/or via some other type of wired or wireless connection. The terminal module also receives and processes data that allows UE 200 to determine what services are available and to select one or more of those available services for reception. In at least some embodiments, service provider 101 transmits metadata regarding available services, which metadata is used by a UE terminal module to generate an electronic service guide (ESG) or multiple ESGs. The ESG(s) can provide information about available services in a table and/or other format through a graphical user interface presented on a display screen of UE 200, and may organize service information based on one or more criteria such as time, title, genre, user-defined categories, etc.

Figure 3:
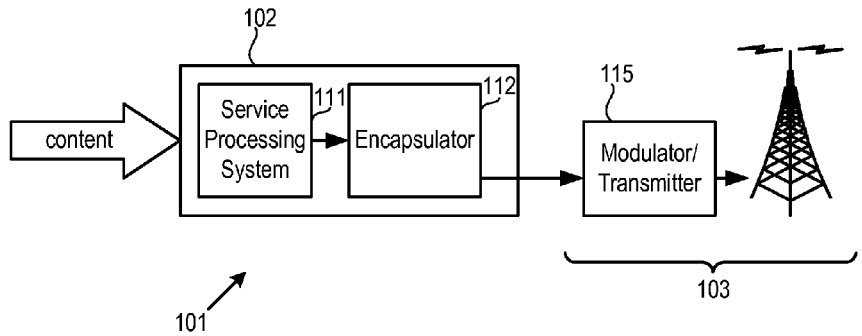
FIG. 3 is a block diagram showing operation of a service provider.

FIG. 3 is a block diagram showing an exemplary operation of a service provider 101. Service provider 101 receives content items from various sources via the Internet, via some other packet data network and/or via some other communication medium. Examples of the received content items include but are not limited to television programs and/or other types of streaming media. Service provider 101 includes one or more computers 102 having processors, memory elements and interface elements, as is known in the art. One or more of computers 102 is programmed via software and/or firmware to operate as a service processing system 111. Computer(s) 102 could also or alternatively be configured, in whole or in part, to operate as a service processing system through one or more application-specific integrated circuits (ASICs) or other dedicated hardware elements. Service processing system 111 may decode and/or re-encode content using multiple different CODECS, and otherwise process incoming content, so to create one or more content data streams for each received item of content. Service processing system 111 also maps data streams to components, and may map components to services. Service processing system 111 forwards the mapped content data streams to an encapsulator 112. Encapsulator 112, which is also physically implemented in hardware and/or programming on the one or more computers 102, packetizes the content data streams utilizing the component mapping. As explained in more detail below, packetizing the content data includes segmenting the data streams into protocol data units (PDUs) according to a first communication protocol, which in some embodiments is a protocol at the transport layer of the open systems interconnection (OSI) model, and assigning values to data fields of those PDUs based on the mapped component.

In some embodiments, and as also described below, encapsulator 112 further performs one or more additional layers of encapsulation by placing first protocol packets or segments thereof into PDUs according to another protocol. In some embodiments, data in the data stream forwarded to the encapsulator is already encapsulated according to one or more protocols. Upon receipt of such a data stream at the encapsulator, one or more of the headers in the pre-existing encapsulation may be removed. In still other embodiments, a data stream may have pre-existing encapsulation before reaching the encapsulator, but one or more of the headers of that pre-existing encapsulation are removed before the data stream is provided to the encapsulator.

As used herein, "packet" is synonymous with "data unit" and "PDU." For example, a UDP data unit is the same as a UDP packet.

Packets output by encapsulator 112 are forwarded to modulator and transmitter 115. To the extent not already performed by encapsulator 112, modulator and transmitter 115 segments those packets and places them into frames used by lower level network protocols, such as, for example, OSI layer 1 and 2 protocols. In practice, this may entail several steps of encapsulating a packet according to several lower level protocols.

In at least some embodiments, encapsulator 112 places content data into User Datagram Protocol (UDP) packets. The user datagram protocol is known in the art and is described by the Internet Engineering Task Force Request for Comment number 768 (IETF RFC 768). The header of a UDP packet includes a "source port" field and a "destination port" field. In some embodiments, one of these fields is used to identify a service provider and the other of those fields is used to identify a component. In some such embodiments, service provider 101 assigns the source port field a value that corresponds to service provider 101, and that may in some embodiments be globally unique across a particular transmission network. Further, service provider 101 assigns a value to the destination port field that corresponds to a particular component, which value may be unique for service provider 101, and which distinguishes the component from other components associated with a particular service. In still other embodiments, the source port field is used to identify a component and the destination port field is used to identify a provider. In yet other embodiments, encapsulator 112 may encapsulate a UDP packet according to the Generic Stream Encapsulation (GSE) protocol, as described in document A116 (dated May 2007) published by the Digital Video Broadcasting (DVB) Project of Geneva, Switzerland.

A service is mapped to components using higher level metadata such as data within an ESG. In some cases, data for an ESG may be provided by a single service provider and only relate to services obtained from that service provider. In other cases, data for an ESG may come from multiple service providers and relate to services from those service providers. In still other cases, a UE may have access to multiple ESGs.

Figure 19:
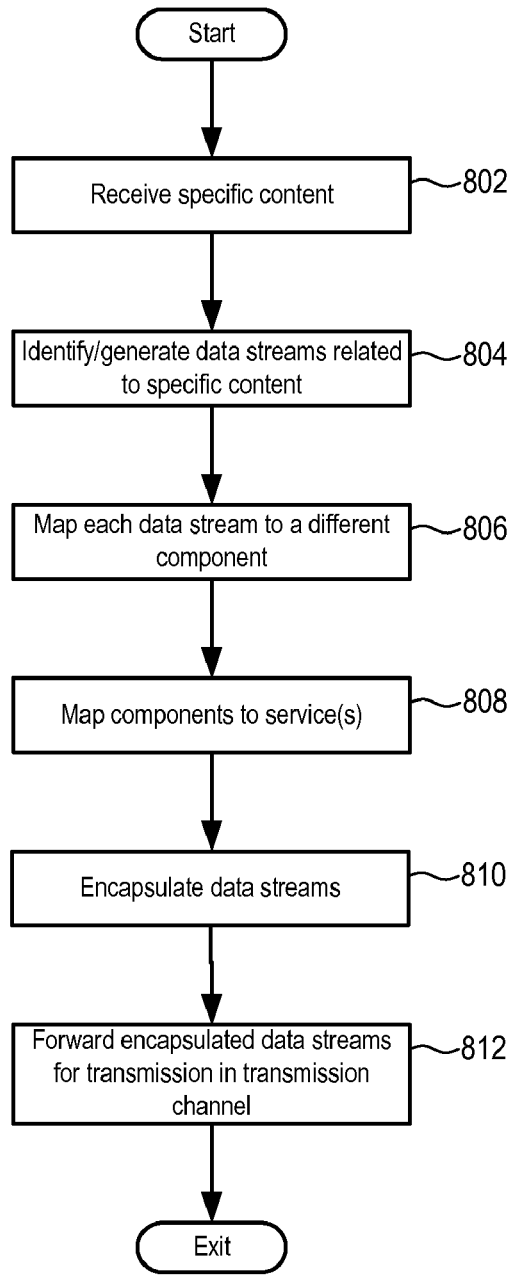
FIG. 19 is a flow chart showing operations performed by one or more computers of a service provider according to at least some embodiments.

FIG. 19 is a flow chart showing operations performed by one or more computers 102 of service provider 101 according to at least some embodiments. Beginning in block 802, computer(s) 102 of service provider 101 receive a specific item of content via, e.g., the Internet or other network. Next, computer(s) 102 identify and/or generate data streams relating to the specific content (block 804). In some cases, computer(s) 102 may receive the specific item of content in the form of multiple pre-prepared data streams, for example in different languages, coded by different CODECs, etc., in which cases computer(s) 102 may simply identify those pre-prepared streams. In other cases, computer(s) 102 may generate data streams by encoding the specific content received in block 802 using different CODECs, etc. Data streams related to the content could also be created in other ways. Flow then proceeds to block 806, where computer(s) 102 map each of the data streams to a distinct component. The mapping of block 806 may include storing and/or generating one or more component-identifying values for each component. In some embodiments, and as discussed below in connection with block 810, these component-identifying values will be inserted into UDP destination port fields. In still other embodiments, operations of block 806 include storing and/or generating values for fields of a packet according to another protocol that will not actually be used to encapsulate content data streams prior to transmission in the transmission channel. In some embodiments, that other protocol may be IP.

Computer(s) 102 then map each component to one or more services in block 808. As explained below, a component could be mapped to multiple services. Service-component mapping may include creation of metadata for an ESG and/or processing and/or storing such metadata received from other sources. Flow proceeds from block 808 to block 810, where the content data streams are encapsulated. In some embodiments, the data streams are encapsulated in UDP packets and the component-identifying values inserted into the UDP destination port fields. Additional layers of encapsulation may also be performed. For example, and as discussed below, encapsulation into baseband frames may be performed. From block 810, flow proceeds to block 812, where frames are forwarded for transmission in a transmission channel.

Figure 4:
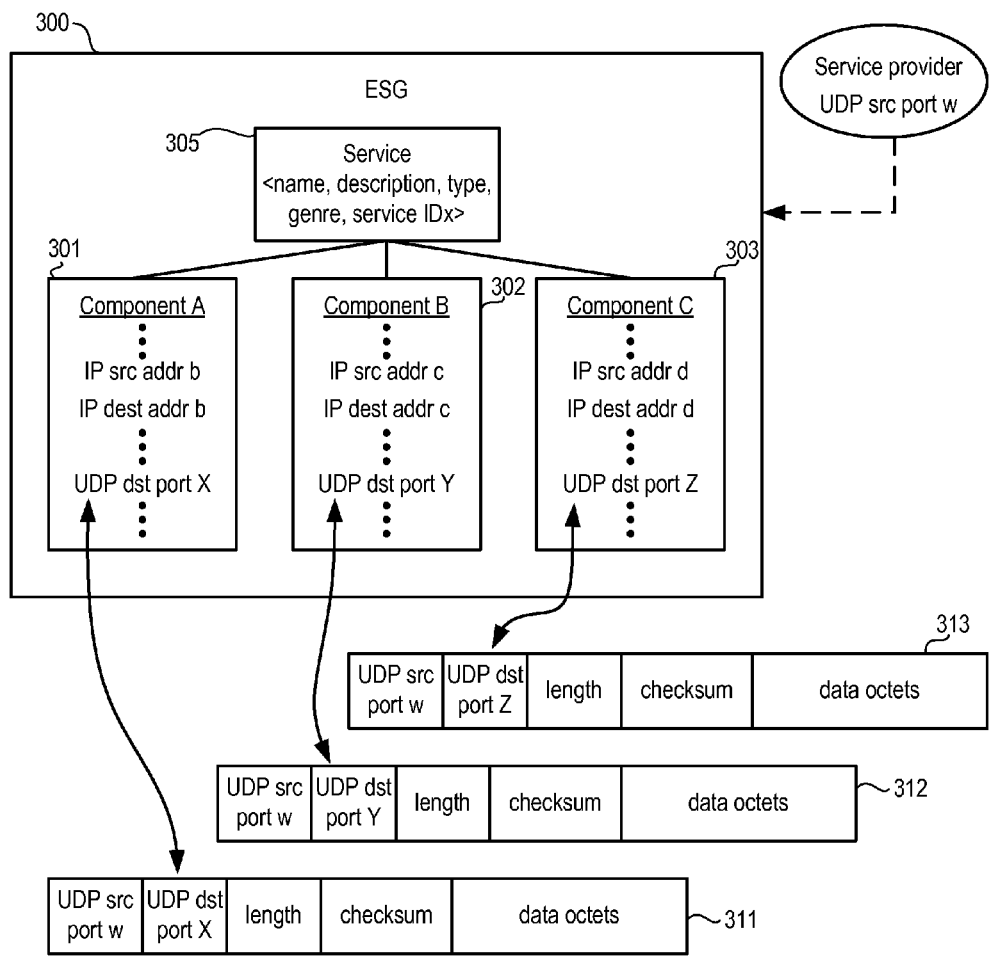
FIG. 4 is a block diagram explaining mapping of components to services according to at least some embodiments.

FIG. 4 is a block diagram explaining mapping of components to services according to at least some embodiments. ESG 300, which is shown in FIG. 4 as a box for simplicity, includes one or more programs to track available services, to provide information about services to a user, and to retrieve components for a service selected by a user. ESG 300 further accesses one or more databases that contain information about services and that map components to services. A portion of such a database is shown in FIG. 4 as blocks 301 through 305, which illustrate the mapping of components A, B and C to a service (block 305). As shown by block 305, descriptive information may be stored for each service accessible through ESG 300. In the present example, that information includes a name, a description, a type, a genre, and a service identification number (serviceIDx). ESG 300 further includes data that maps service 305 to associated components A, B and C. Only three components are shown in FIG. 4, but a service could be associated with more or fewer components. Each component is also identified in this example by a UDP destination port number. In some embodiments, and as is further discussed below, components may also include internet protocol (IP) source and/or destination addresses as identifiers.

Also shown in FIG. 4 is the relationship of components A, B and C to UDP packets 311, 312 and 313 containing content data mapped to those components. As indicated above, UDP packets are created by a service provider and transmitted to a UE. Each component would be associated with a stream of UDP packets. Packet 311 is one packet in the stream associated with component A, packet 312 is one packet in the stream associated with component B, and packet 313 is one packet in the stream associated with component C. Each UDP packet in the streams for components A, B and C will have the same value ("w") in the UDP source port field, which value corresponds to the service provider offering service 305. The destination port field of each UDP packet for component A will have the value "X," which value is used by ESG 305 to identify component A. The destination port field in each UDP packet for component B will have the value "Y" and the destination port field in each UDP packet for component C will have the value "Z," which values are used by ESG 305 to identify components B and C. If UDP packets 311, 312 and 313 were further encapsulated within IP packets (as discussed below in connection with FIGS. 10-12), the IP source and destination addresses for the encapsulating IP packets could also be used by ESG 305 to identify components A, B and C.

The length field in each UDP packet is the length in bytes of the packet including header, and the data octet field carries the actual user data such as audio, video, text, etc. for the component. The checksum fields contain values used to error-check the data and header in a UDP packet. The checksum field is ignored in some embodiments. In embodiments discussed below where UDP packets are encapsulated in IPv4 packets, the checksum can be calculated as set forth in IETF RFC 768. In embodiments where UDP packets are encapsulated in IPv6 packets, the checksum can be calculated as set forth in IETF RFC 2460.

A receiver module of a UE receives information that allows it determine a physical layer pipe (PLP) carrying data for a particular component. A PLP represents a particular time division multiplex slot or set of slots and/or one or more frequency sub-bands over which lower layer protocol frames carrying packets for a particular component will be received. A PLP may also or alternatively include a spread spectrum spreading code associated with a particular component. In at least some embodiments, packets containing desired UDPs are mapped to PLPs according to the Next Generation Handheld (NGH) standard as defined in draft European Telecommunications Institute ("ETSI") standard EN 302 755 ("Digital Video Broadcasting (DVB); Frame structure channel coding and modulation for a second generation digital terrestrial television broadcasting system (DVB-T2)"), dated April 2008 (hereinafter, "draft ETSI EN 302 755"). A copy of draft ETSI EN 302 755 is submitted concurrently with the filing of this specification.

Figure 5:
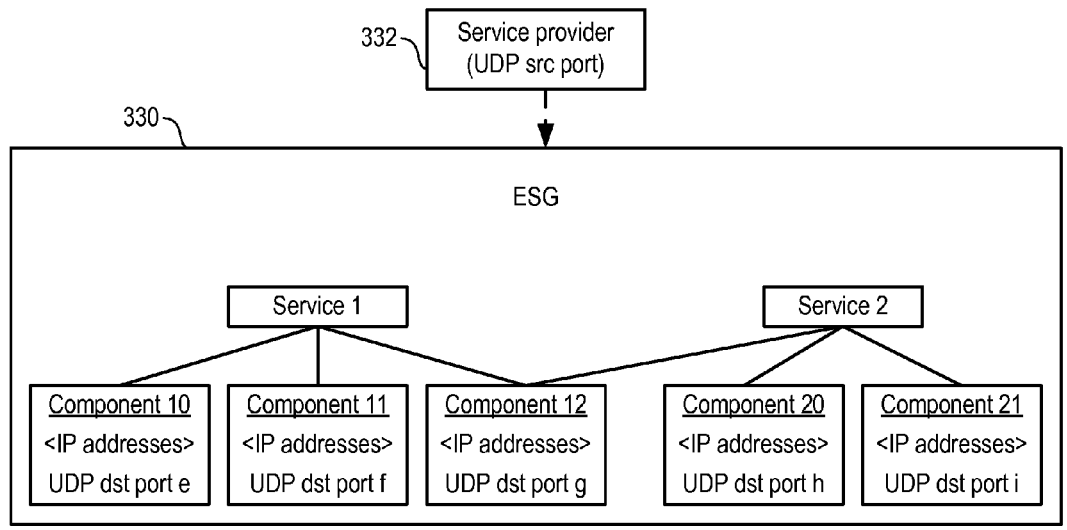
FIG. 5 is a block diagram of an electronic service guide (ESG).
Figure 6:
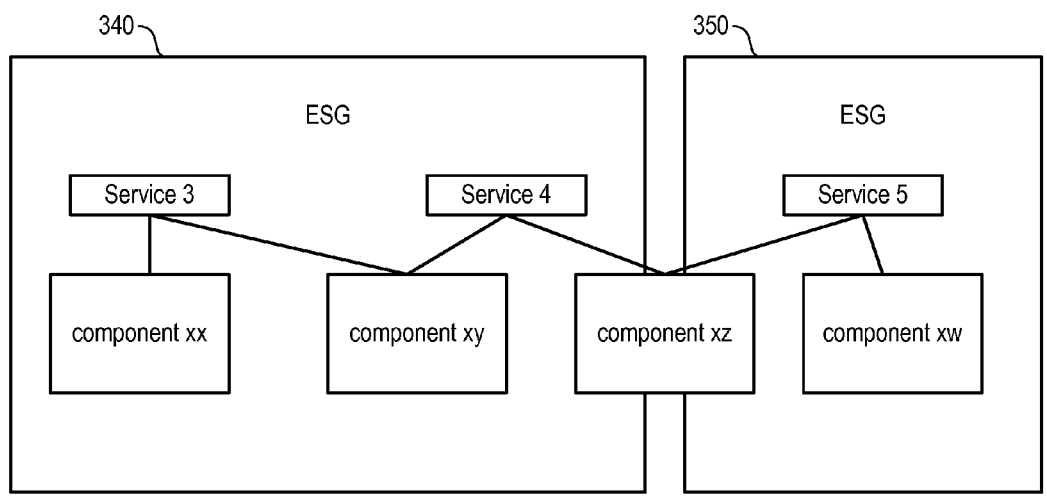
FIG. 6 is a block diagram showing a component mapped to multiple services and/or to services within different ESGs.

Because a service is a virtual construct to which components are mapped by higher level metadata in an ESG, various scenarios can be easily accommodated. As indicated above, the same component can be mapped to multiple services. For example, FIG. 5 is a block diagram of an ESG 330 provided by service provider 332 and that includes metadata for service 1 and service 2. Components 10 and 11 are mapped to service 1, components 20 and 21 are mapped to service 2, and component 12 is mapped to both services 1 and 2. Although only two services are shown in FIG. 5, multiple other services could be included, and a component could be shared by more than two services. Indeed, and as shown in FIG. 6, a component could be mapped to multiple services and/or to services within different ESGs. ESG 340 includes services 3 and 4. Component xx is only mapped to service 3, and is thus unique to service 3. Component xy is mapped to services 3 and 4. ESG 350 includes service 5, to which component xw is uniquely mapped. Component xz, however, is mapped to service 4 in ESG 340 and to service 5 in ESG 350.

Figure 7:
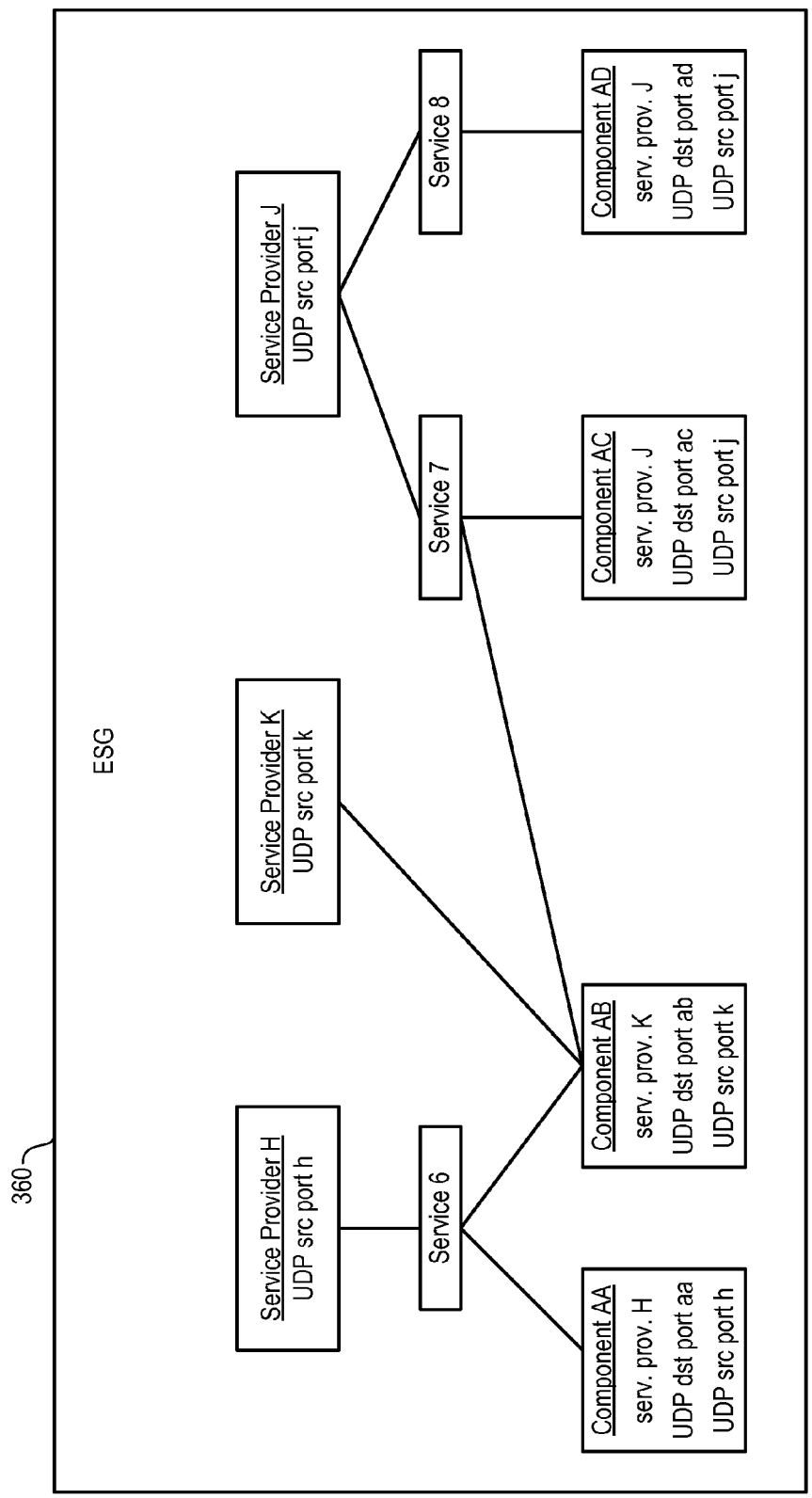
FIG. 7 shows an example of a scenario in which an ESG includes services that include components from separate service providers.

FIG. 7 shows an example of a scenario in which an ESG 360 includes services that include components from separate service providers. Service 6 is associated with service provider H, identified by source port data "h" in the UDP header, and services 7 and 8 are associated with service provider J, identified correspondingly by source port data "j" in the UDP header. Component AB is mapped to service 6 and to service 7. Component AB is associated with a virtual "third party" service provider K that may be identified by source port data "k" in the UDP header. In some embodiments, an ESG associates a component with a service based on data in the component identifying the provider of that service, e.g., based on a data value in the source port field. Implementing a virtual service provider and assigning identifying data corresponding to that virtual provider is one way to avoid a need for two source port fields or to otherwise have two pieces of provider-identifying data in the header of a component AB data packet.

Figure 8:
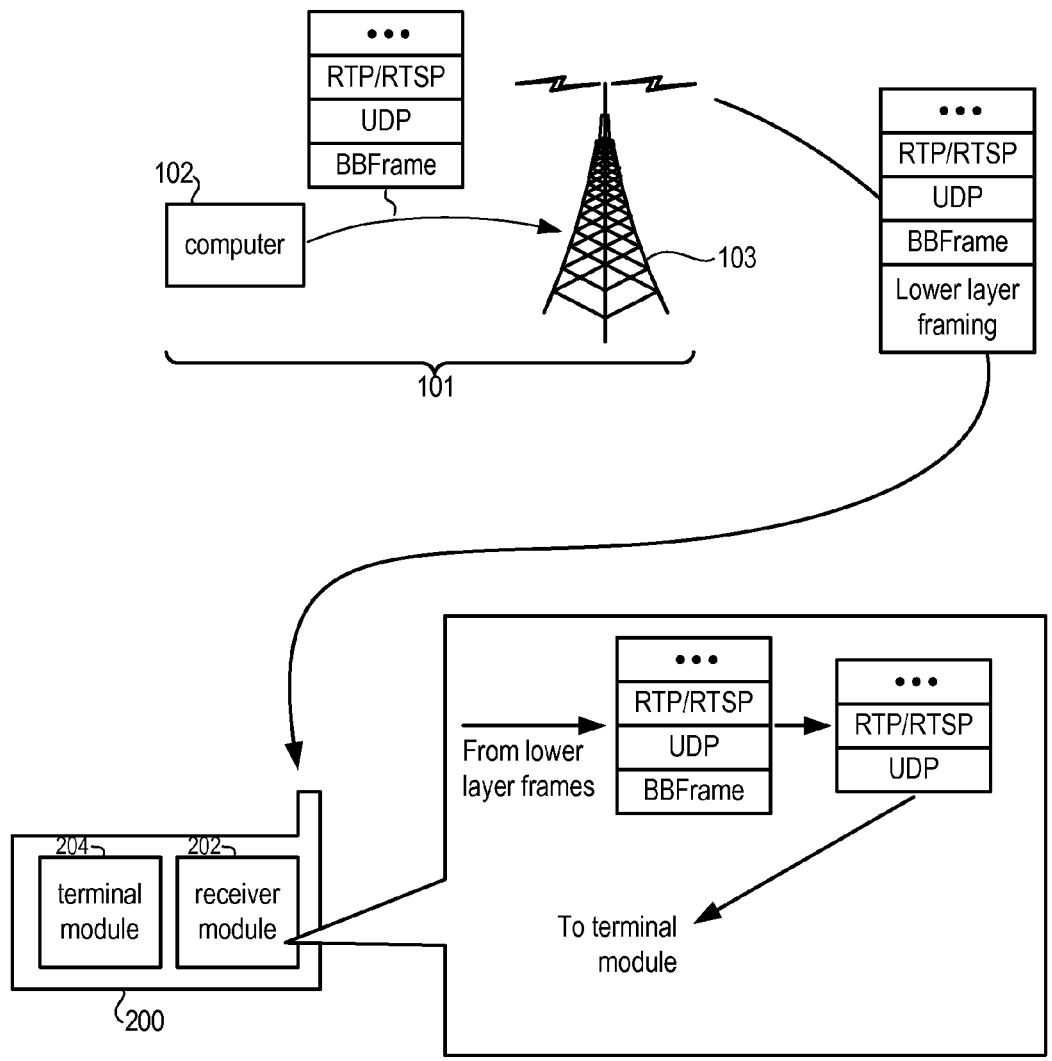
FIGS. 8-12 are block diagrams showing encapsulation and transmission of components by a service provider, as well as reception and processing by a user equipment (UE), according to at least some embodiments.

FIG. 8 is a block diagram showing encapsulation and transmission of components by service provider 101, as well as reception and processing by UE 200, according to at least some embodiments. In the drawings showing various embodiments, the same reference numbers will be used to identify service provider 101 and UE 200 and elements thereof. It is to be appreciated, however, that differences among the various embodiments may in some cases result from variations in program instructions within elements of service provider 101 and/or of UE 200. In the embodiment of FIG. 8, service provider 101 receives content from any of multiple sources that are not shown in FIG. 8. That content may be in any of various protocols, including real-time transport protocol (RTP), real-time streaming protocol (RTSP), etc. Service provider 101 may perform coding using one of multiple CODECs and/or may perform protocol conversion. Service provider 101 maps data streams to components and places component data into UDP packets. Service provider 101 maps services to components by mapping metadata for services to components that are identified by a particular combination of UDP source port and UDP destination port values. Examples of such service metadata include but are not limited to type, name, genre, group, etc. Service provider 101 then further encapsulates component UDP packets into frames according to one or more lower layer protocols. In the examples of FIGS. 8 through 12, the UDP packets are encapsulated into baseband frames ("BBFrame") according to draft ETSI EN 302 755. Notably, a baseband frame, or a lower layer frame according to some other protocol, may contain UDP packets for more than one component. For example, a BBFrame may contain UDP packets having different destination port values. The baseband frames, or the otherwise-encapsulated UDP packets, are ultimately transmitted in frames according to still lower layer protocols. In some embodiments, these lower layer protocol frames include T2 frames according to draft ETSI EN 302 755. Notably, component UDP packets in the embodiment of FIG. 8 are not encapsulated in IP packets at service provider 101.

Receiver module 202 of UE 200 receives and demodulates the transmitted signal from service provider 101, extracts the baseband frames from the transmission frames, decapsulates the UDP packets from the baseband frames, and makes those UDP packets available to terminal module 204. In some embodiments discussed below, receiver module 202 may encapsulate UDP packets before providing them to terminal module 204. Terminal module 204 processes component UDP packets for a desired service using a media player or other appropriate application. Receiver module 202 selectively retrieves UDP packets corresponding to components of a desired service selected by a user of UE 200, and ignores packets corresponding to undesired components. As discussed above, all of the components mapped to a particular service might not be needed by a particular UE. Accordingly, terminal module 204 identifies the desired components for a selected service based, for example, on the source port and destination port values in the UDP packets, and provides information about the desired packet and service to receiver module 202. A terminal module may in some embodiments determine desired components in response to an end user's selection, via an ESG UI, of a particular version of a specific content. For example, a user may select a particular program in a particular language and/or at a particular presentation quality.

Using the PLP mapping described above, receiver module 204 looks for and extracts baseband frames or otherwise encapsulated UDP packets from the transmission channel. Receiver module 202 then extracts the UDP packets for the desired components, forwards those packets to terminal module 204, and disregards UDP packets corresponding to undesired components.

In some cases, terminal module 204 also communicates with service provider 101 using an interactive connection that may be established via one or more wired or wireless networks not shown in FIG. 8, which wired/wireless network(s) may be distinct from the transmission network over which service provider 101 transmits service components. One example of such an interactive connection is a DVB interaction channel such as is described in European Telecommunication Standard (ETS) 300 801, in ETSI EN 301 958 v1.1.1, in ETSI 301 195 v1.1.1, or in other standards. Although an interactive connection may be through networks other than the transmission network of service provider 101, UE 200 may nonetheless use some of the same hardware elements for all communications.

Figure 9:
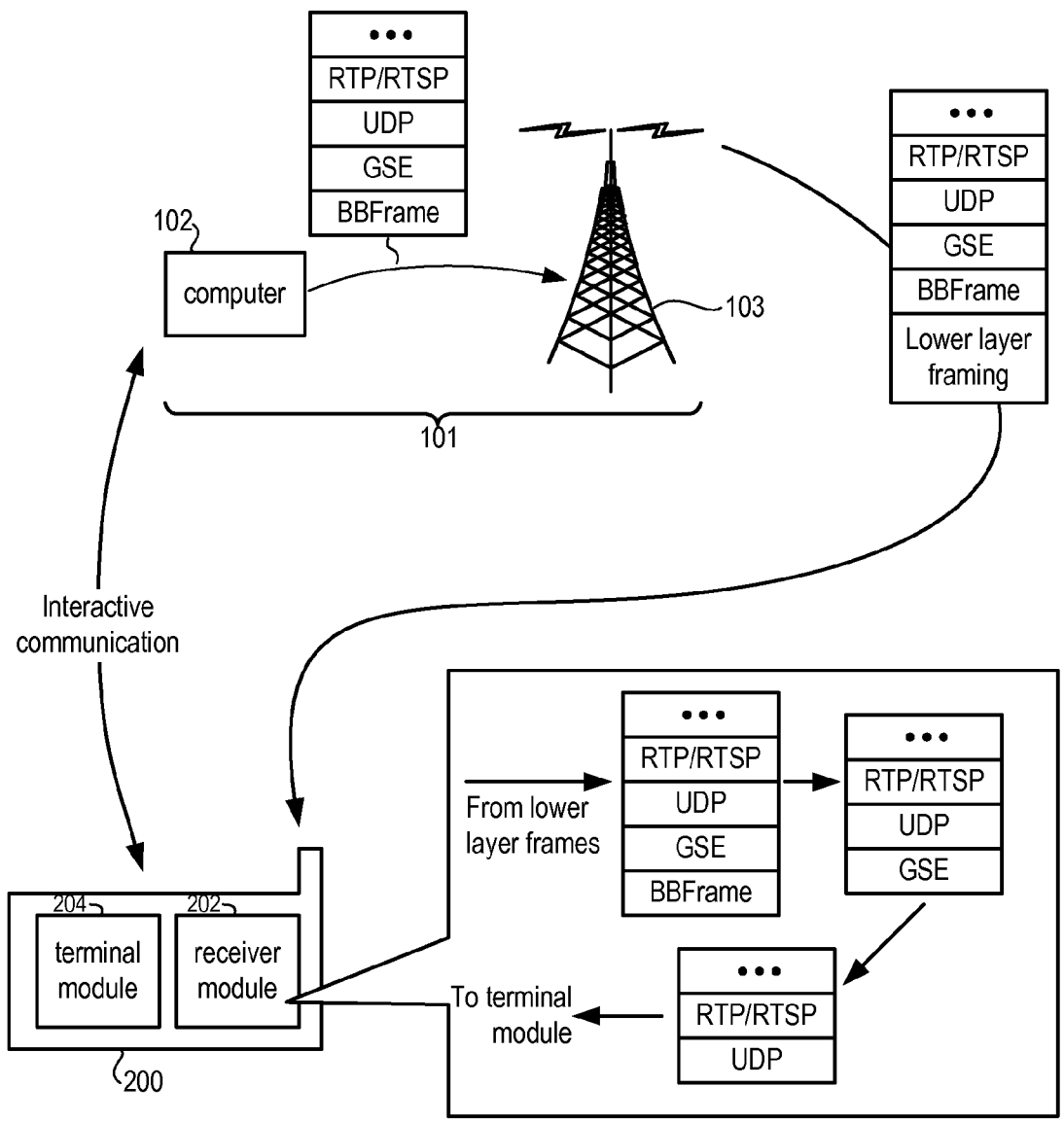

FIG. 9 is a block diagram showing encapsulation and transmission of components by service provider 101, as well as reception and processing by UE 200, according to at least some additional embodiments. FIG. 9 is similar to FIG. 8, except that service provider 101 encapsulates UDP packets corresponding to components in PDUs according to an additional protocol prior to encapsulation in baseband frames. In the example of FIG. 9, that additional protocol is GSE. Receiver module 202 decapsulates the UDP packets from the baseband frames and from the GSE or other protocol packets.

In some situations, it may be useful to further encapsulate component UDP packets into Internet Protocol version 4 (IPv4) packets or into Internet Protocol version 6 (IPv6) packets. IPv4 and IPv6, which are also well known in the art, are described by IETF RFC 791 and IETC RFC 2460, respectively. Source and destination addresses in an IPv4 or IPv6 packet can similarly be used to identify a service provider and a component. For example, a UE may re-distribute data for service components in a point-to-point IP network such as a WLAN. As another example, a particular terminal module may have an IP stack implementation that requires an IP packet format. However, encapsulating service component UDP packets in IP packets at the service provider has undesirable consequences. In particular, encapsulating UDP packets within IP packets will increase the transmission overhead and reduce the amount of content data that can be transmitted in the transmission channel.

Figure 10:
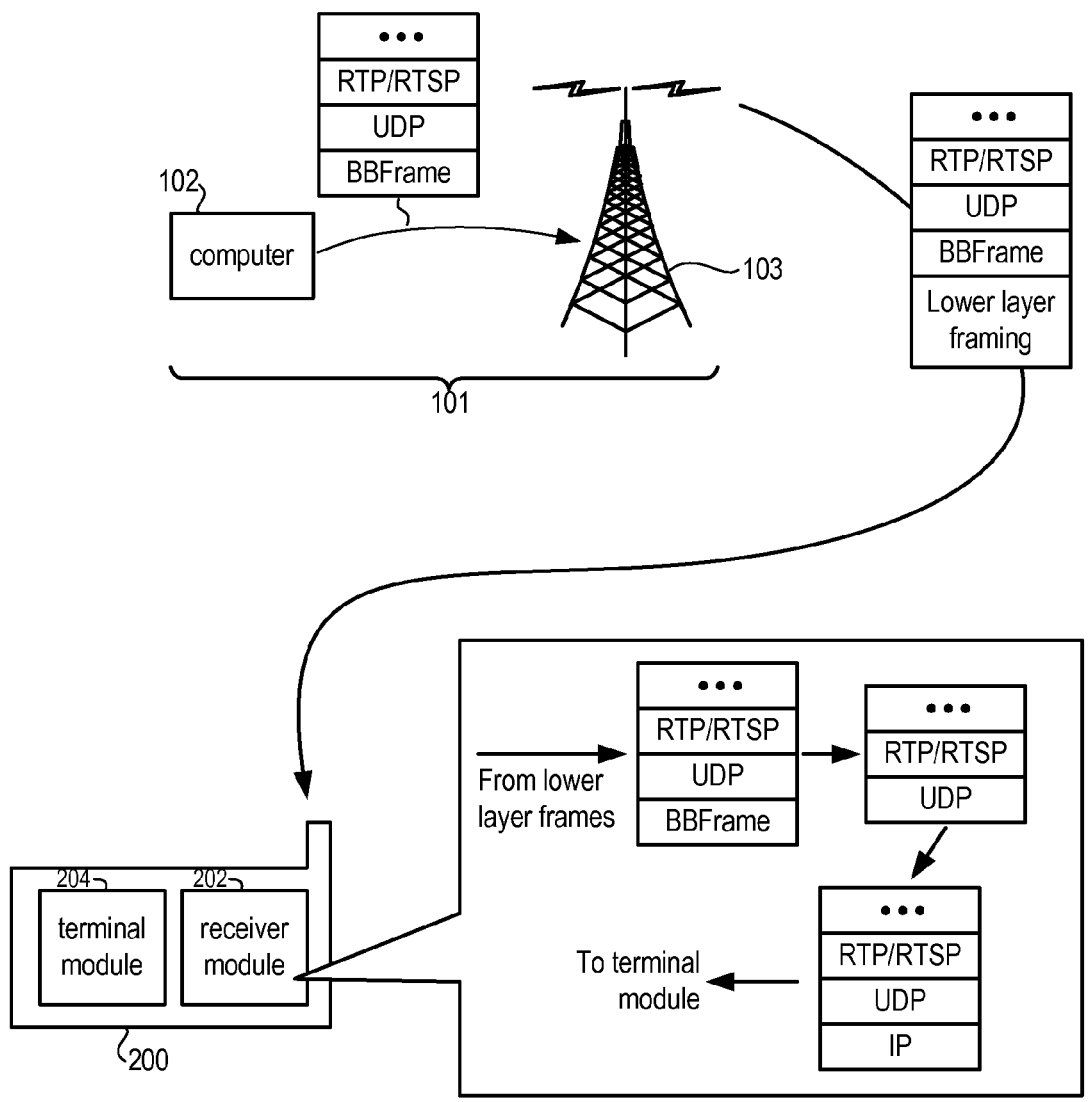

In at least some embodiments, and as shown in FIG. 10, this is overcome by encapsulating UDP packets into IP packets at the UE receiver module. As in the embodiment of FIG. 8, service provider 101 maps a service to components by mapping metadata for the service such as type, name, genre, group, etc. to components that are identified by a particular combination of UDP source port and UDP destination port values. Service provider 101 may also map those components to IP source and destination addresses, but does not encapsulate the UDP packets in IP packets. Service provider 101 then encapsulates the component UDP packets into baseband frames and causes those baseband frames to be transmitted. Upon receipt, receiver module 202 of UE 200 decapsulates the UDP packets from the baseband frames. Receiver module 202 then encapsulates the UDP packets into IP packets. In some embodiments, receiver module 202 acquires values for IP source and destination addresses from the service-related metadata. Although not shown in FIG. 10, the service-related metadata, which is also used by one or more ESGs accessible in UE 200, may be separately transmitted to receiver module 202 from service provider 101 in UDP packets corresponding to ESG data. After IP-encapsulating the component UDP packets, receiver module 202 forwards those IP packets to terminal module 204 for decapsulation and further processing.

In some embodiments, predefined IP source and destination addresses may not be needed. For example, terminal module 204 may require that service components be encapsulated within IP packets, but the ESG and/or other applications operating in terminal module 204 may identify components based on UDP source and destination ports and the component data will not be forwarded to other devices. In such a case, receiver module 202 can use any appropriate IP address. In some embodiments, a link local address of 127.0.0.1 is used in such cases. In still other embodiments, receiver module 202 encapsulates component UDP packets into packets according to some other protocol.

Figure 11:
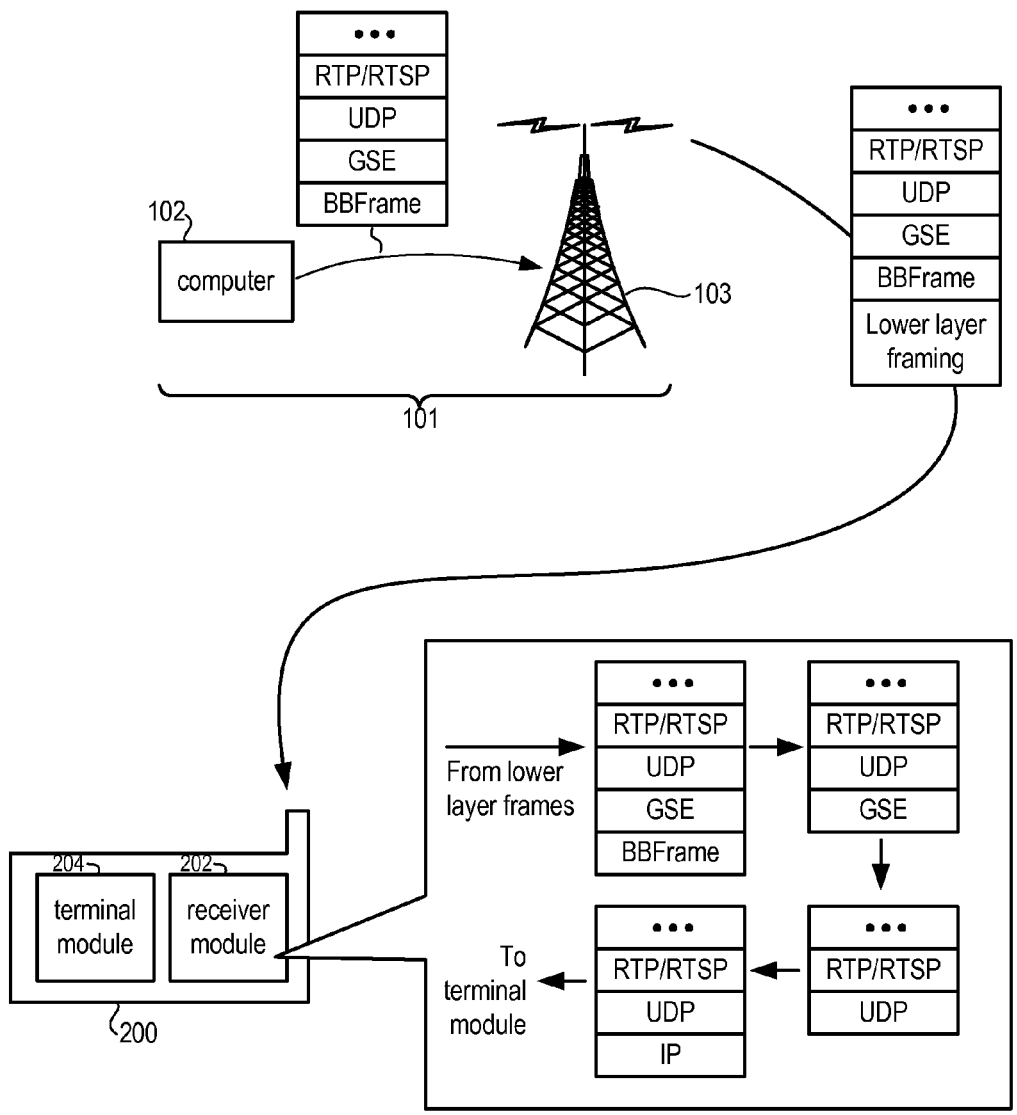

FIG. 11 is a block diagram of an embodiment that combines aspects of the embodiments of FIGS. 9 and 10. As in the embodiment of FIG. 10, service provider 101 also maps components to IP source and destination addresses, but does not encapsulate UDP packets in IP packets. As in the embodiment of FIG. 9, service provider 101 encapsulates component UDP packets in PDUs according to another protocol such as GSE. Service provider 101 then encapsulates the encapsulated component UDP packets into baseband frames and causes those baseband frames to be transmitted. Upon receipt, receiver module 202 of UE 200 decapsulates the UDP packets from the baseband frames and from the GSE or other protocol packets. Receiver module 202 then encapsulates the component UDP packets into IP packets. As with the embodiment of FIG. 10, IP source and destination addresses can be obtained from separately-transmitted service metadata. If predefined IP addresses are not required, 127.0.0.1 or another appropriate generic address can be used. In some embodiments, component UDP packets could be encapsulated by receiver module 202 according to a protocol other than IP. Receiver module 202 forwards encapsulated component UDP packets to terminal module 204 for decapsulation and further processing.

Figure 12:
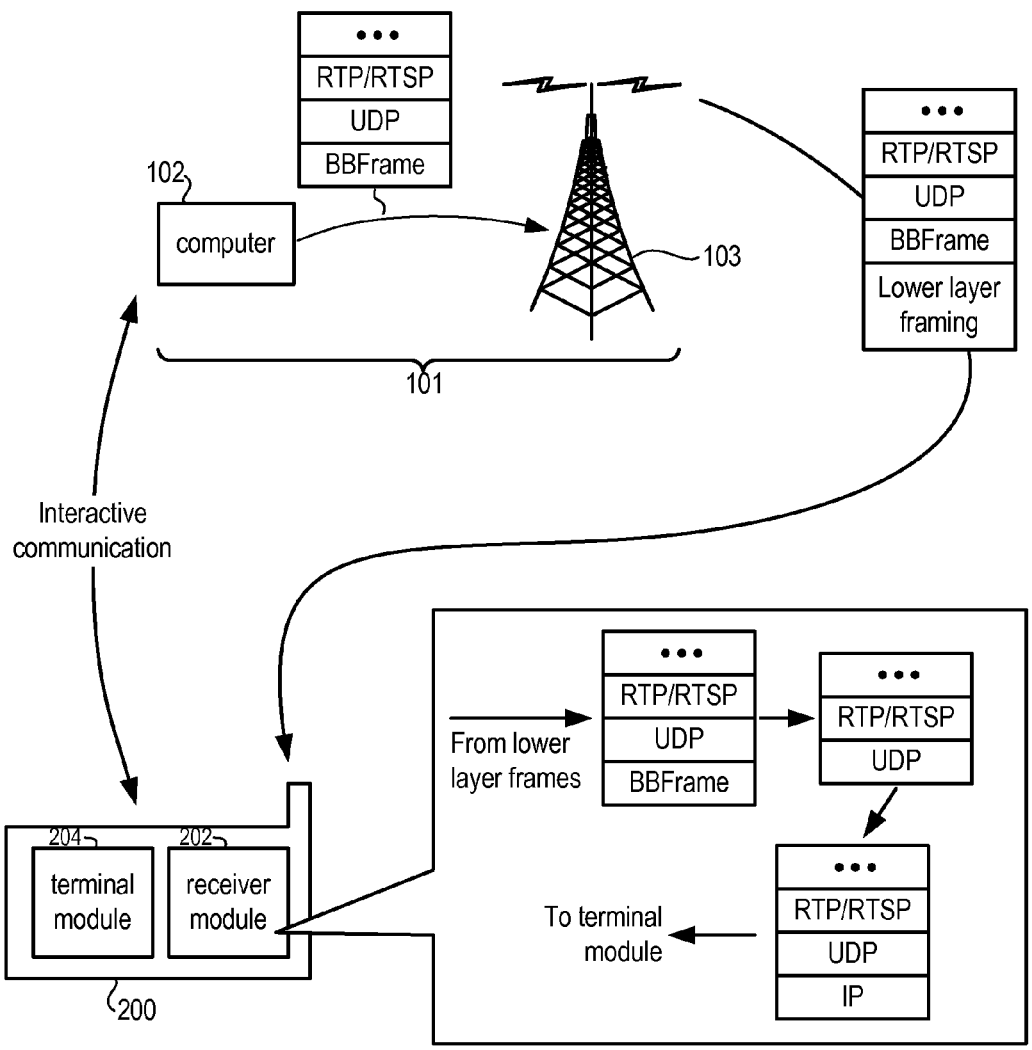

FIG. 12 is a block diagram of an embodiment that is similar to the embodiment of FIG. 10, but in which IP source and destination addresses are obtained in a slightly different manner. As in FIG. 10, service provider 101 maps a service to components by mapping metadata for the service to components that are identified by a particular combination of UDP source port and UDP destination port values. Service provider 101 also maps those components to IP source and destination addresses without encapsulating those UDP packets in IP packets. Service provider 101 encapsulates the component UDP packets into baseband frames and causes those baseband frames to be transmitted. Upon receipt, receiver module 202 decapsulates the UDP packets from the baseband frames. Receiver module 202 then encapsulates the UDP packets into IP packets. In the embodiment of FIG. 12, however, terminal module 204 requests that service provider 101 provide values for IP source and destination addresses to be used when encapsulating component UDP packets. Terminal module 204 makes this request through interactive communication over one or more wired or wireless networks, such as an interaction channel, that may be separate from the transmission network over which service provider 101 transmits service components. Terminal module 204 provides those IP addresses, after receipt of same from service provider 101 via the interactive communication, to receiver module 202. Receiver module 202 then uses those IP addresses when IP-encapsulating component UDP packets.

Figure 13:
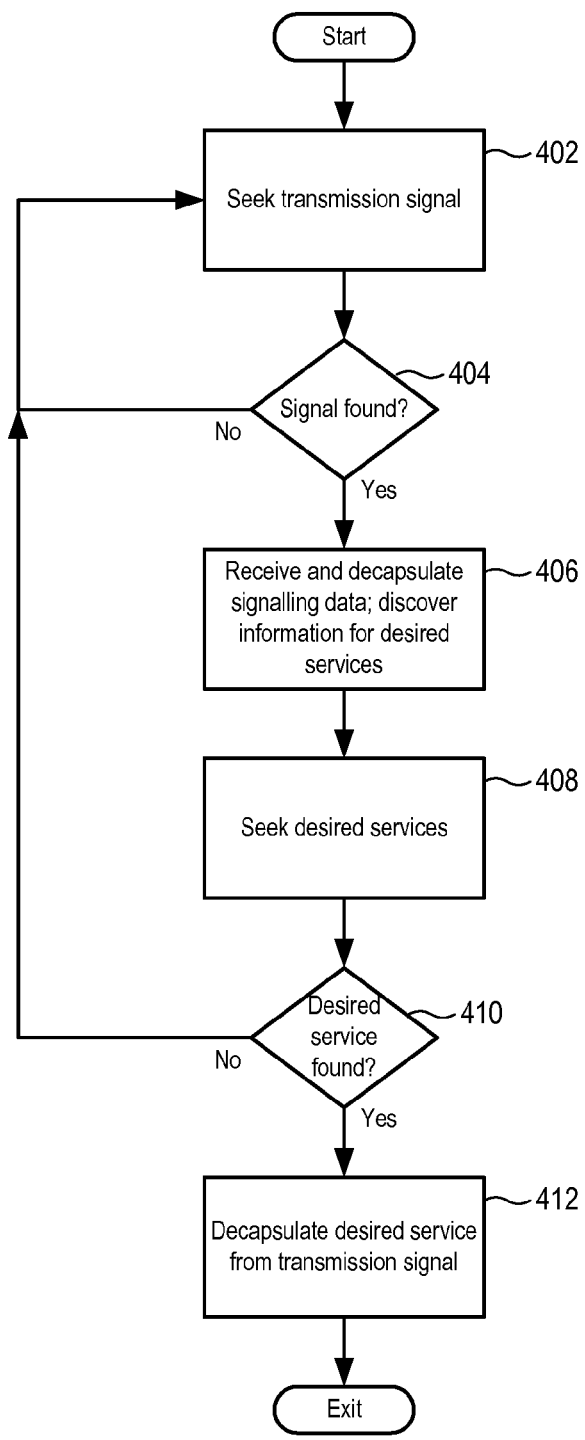
FIG. 13 is a flow chart showing signal and service discovery by a UE according to at least some embodiments.

FIG. 13 is a flow chart showing signal and service discovery by a UE according to at least some of the above-described embodiments. Beginning in block 402, the UE receiver module searches for a signal that carries service metadata and components. In some embodiments, the receiver module looks for a signal having a predefined preamble indicative of transmissions according to an appropriate protocol and/or identifying a particular transmission network. For example, the receiver module may search for a transmission from a network operating according to the Next Generation Handheld (NGH) standard as defined in draft ETSI EN 302 755 by searching for a P1 symbol. The receiver module may also or alternatively have a list of signals which carry the desired data, and/or may have acquired a list of such signals through bi-directional communication over an interactive network. In block 404 there is a determination of whether the desired signal has been found. If the desired signal is found, flow proceeds on the "yes" branch to block 406. Otherwise, flow returns to block 402 on the "no" branch and the search is continued.

In block 406, the receiver module receives and decapsulates signaling data and discovers information relating to desired services. A desired service may be, e.g., a service selected by an end user of the UE via an ESG. In some embodiments, the signaling data received in block 406 is data needed to find desired service components. Signaling data may also include information such as IP addresses that would be used to encapsulate UDP packets before forwarding those UDP packets to the terminal module. Also received and decapsulated in block 406 is information for one or more ESGs. Data for the ESG, which may include metadata about services and components mapped to those services, may also be transmitted by a service provider in UDP packets. In at least some embodiments, a UE receiver module detects ESG data based on an ESG component identification composed of a UDP source port value corresponding to a specific service provider and a UDP destination port value corresponding to an ESG bootstrap. In addition, or alternatively, the UE may receive ESG data or parts thereof through an interactive communication over another network. A UE may be preprogrammed with PLP mappings for ESG data, or may receive such mappings via a separate interactive communication channel.

From block 406 flow proceeds to block 408, where the receiver module seeks components for desired services. If data for a desired service is not found (block 410), flow returns on the "no" branch to block 402. If data for a desired service is found, flow proceeds on the "yes" branch to block 412, where data for the desired service(s) is decapsulated.

Figure 14:
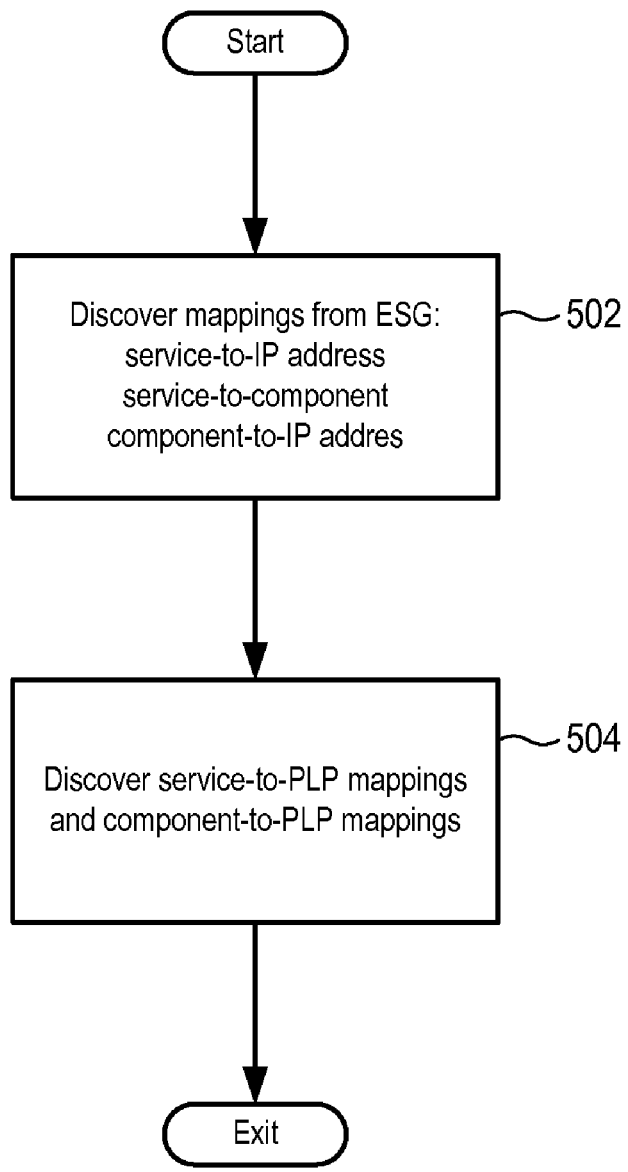
FIGS. 14 and 15 are flow charts providing additional details of operations in FIG. 13.

FIG. 14 is a flow chart providing additional details of operations in block 406 of FIG. 13. In block 502, after receiving and decapsulating ESG data packets, the receiver module discovers service-to-component mappings. In embodiments where IP addresses are used, the receiver module also discovers service-to-IP address mappings and/or component-to-IP address mappings. Relevant parameters used for mappings, and as discussed above, include IP address values, UDP port values, other types of component identifiers, and service identifiers. In block 504, service-to-PLP mappings and component-to-PLP mappings are discovered from signaling data in baseband frames, OSI L2 or data link layer frames, and/or in other lower layer framing. In some embodiments, the service-to-PLP mappings and component-to-PLP mappings are in L2 data such as the DVB Program Specific Information/Service Information (PSI/SI) as described in ETSI EN 300 468, titled "Digital Video Broadcasting (DVB); Specification for Service Information (SI) in DVB systems."

Figure 15:
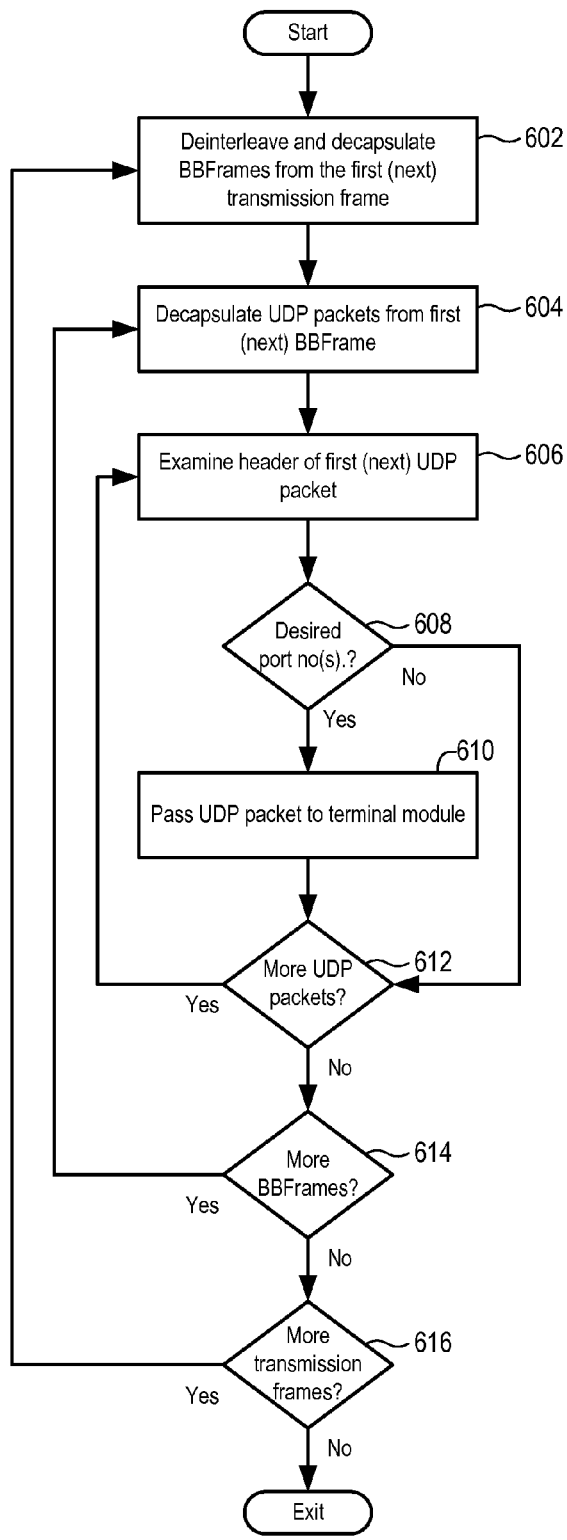

FIG. 15 is a flow chart providing additional details of operations in block 412 of FIG. 13. In block 602, the receiver module deinterleaves and decapsulates desired baseband frames containing component data for desired services from frames of one or more lower level protocols. For example, baseband frames may be encapsulated within NGH T2 frames. The desired baseband frames are identified based on the service-to-PLP mappings and component-to-PLP mappings described above. Next, the receiver module decapsulates UDP packets from the first or next baseband frame (block 604). In block 606, the receiver module examines the source and destination port values in the header of a first or next of those UDP packets. If those port values do not correspond a desired component, the receiver module proceeds to block 612 on the "no" branch; block 612 is discussed below. If the port values do correspond to a desired component, the flow proceeds to block 610 on the "yes" branch, and the UDP packet is passed to the terminal module. In embodiments where the UDP packet is encapsulated in an IP packet, this encapsulation can also be performed as part of the operations of block 610. From block 610, flow proceeds to block 612, where the receiver module determines if there are additional UDP packets in the current baseband frame. If so, flow returns to block 606 on the "yes" branch, where the next UDP packet is examined. If not, flow proceeds to block 614 on the "no" branch to block. In block 614, the receiver determines if there are any additional baseband frames for the associated transmission channel frame. If so, flow returns to block 604 on the "yes" branch, where the UDP packets in the next baseband frame are decapsulated. If not, flow proceeds to block 616 on the "no" branch. In block 616, the receiver determines if there are additional transmission channel frames for the associated PLP. If so, flow returns to block 602 on the "yes" branch. Otherwise, flow proceeds to termination on the "no" branch.

Figure 16:
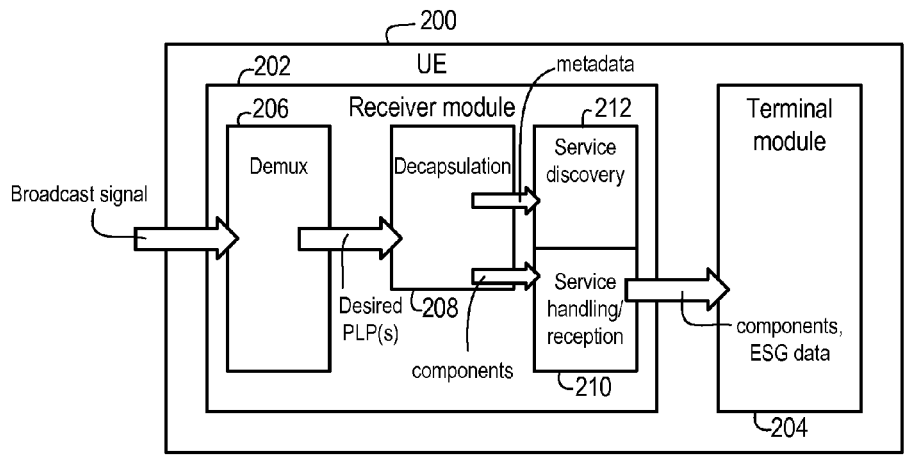
FIG. 16 is a block diagram of a UE showing various operations performed by a receiver module and by a terminal module.

FIG. 16 is a block diagram of UE 200 showing various operations performed by receiver module 202 and by terminal module 204. Demultiplexer 206 extracts signals from the appropriate PLPs of the received transmission channel. Demultiplexer 206 forwards the extracted signal to decapsulator 208, where the appropriate UDP packets are found, for example, as described in connection with blocks 606-612 of FIG. 15, and forwarded to a service handling/reception block 210. Service metadata is forwarded to a service discovery block 212. Service discovery block 212 processes that metadata and forwards same to terminal module 204 for processing by one or more ESGs. Component UDP packets are forwarded by service handling and reception block 210 to terminal module 204. If the component UDP packets are to be encapsulated in IP (or other) packets, service handling/reception block 210 performs this encapsulation prior to forwarding the component data to terminal module 204. Receiver module 202 and terminal module 204 are implemented as one or more ASICs or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Figure 17:
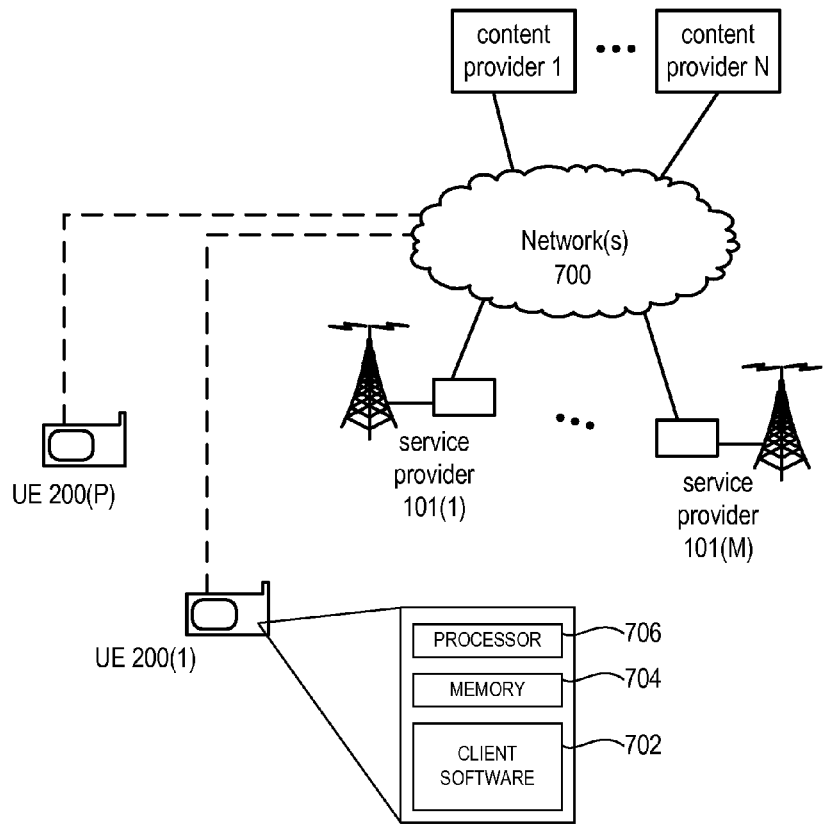
FIG. 17 illustrates a more detailed example of various communication networks in which one or more embodiments may be practiced.

FIG. 17 illustrates a more detailed example of various communication networks in which one or more of the herein-described embodiments may be practiced. One or more service providers 101(1) through 101(M) communicate with one or more of various content providers 1 through N via network(s) 700. UEs 200(1) through 200(P) communicate with one or more of service providers 101(1) through 101(M) via network(s) 700 (e.g., through interactive communications as described above) and receive transmissions over broadcast channels from service providers 101(1) through 101(M). As used in connection with this description of FIG. 17, "M," "N" and "P" are arbitrary numbers that can have any value; M may or may not equal N, N may or may not equal P, and P may or may not equal M. Some of UEs 200(1) through 200(P) may only receive communications from and/or interactively communicate with a single service provider, while other UEs may be able to receive from and/or communicate with multiple service providers. Network(s) 700 may include permanent or temporary connections and such connections may be wired or wireless. Communication through network(s) 700 is not limited to the illustrated devices and may include alternative or additional apparatuses such as a home video storage system, a portable audio/video player, a digital camera/camcorder, a positioning device such as a GPS (Global Positioning System) device or satellite, a mobile television, a STB (Set-top Box), a digital video recorder, and the like and in any combination of the aforementioned.

Although shown as a single cloud in FIG. 17 for simplicity, network(s) 700 may in many embodiments include multiple networks that are interlinked so as to provide internetworked communications. Such networks may include one or more private or public packet-switched networks such as the Internet, one or more private or public circuit-switched networks such as a public switched telephone network, one or more cellular networks configured to facilitate communications to and from UEs 200(1) through 200(P) through use of base stations, mobile switching centers, etc., one or more short or medium range wireless communication connection such as a Bluetooth® connection, a UWB (Ultra Wide Band) connection, an infrared connection, a WiBree connection, a wireless local area network (WLAN) according to one or more versions Institute of Electrical and Electronics Engineers standard no. 802.11, or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Further, UEs 200(1) through 200(P) may use various communication protocols for communication through network(s) 700, such as Internet Protocol (IP), Transmission Control Protocol (TCP), Simple Mail Transfer Protocol (SMTP) among others known in the art.

UEs 200(1) through 200(P) may be configured to interact with each other or other devices using various software. In one example, UE 200(1) may include client software 702 that is configured to coordinate the transmission and reception of information to and from a service provider as described in one or more of the embodiments discussed above. Client software 702 may be stored in memory 704 such as read only or random access memory in UE 200(1) and may include instructions that cause one or more components (e.g., processor 706, a transceiver, a display) of UE 200(1) to perform various functions and methods including those described herein.

In FIG. 17 the network(s) 700 may be operated by one or more network operators. Some or all of those network operators may be different entities than the content providers 1 through N and/or may be different entities than the service provider 101(1) through 101(M). In some embodiments, however, a single entity may act as a service provider and as a network operator, as a service provider and as a content provider, as a service provider, network operator and content provider, etc. ESGs may in various embodiments be provided by the network operators and/or by the service providers 101(1) through 101(M). In some embodiments, the data field in a UDP header identifying a service provider may thus identify a network operator. In some embodiments a network operator may replace service provider identification data in a UDP source port field with data identifying the network operator.

Figure 18:
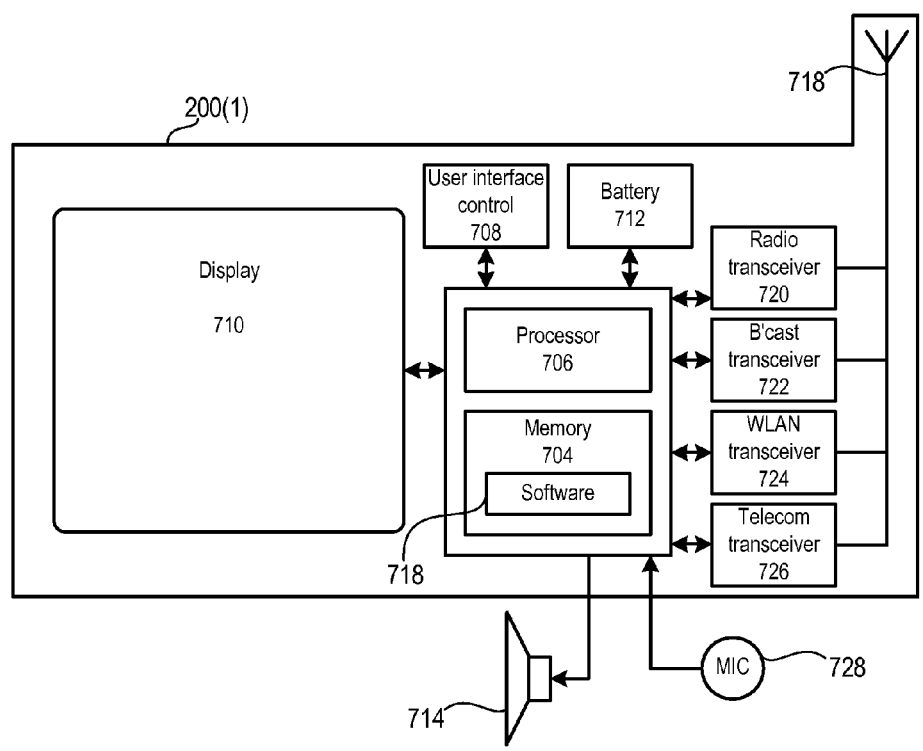
FIG. 18 is a more detailed block diagram of a UE according to some embodiments.

FIG. 18 is a more detailed block diagram of an exemplary UE 200(1). As indicated above, UE 200(1) may include one or more processors 706. Said processors are communicatively connected to user interface control 708, memory 704 and/or other storage, and display 710. UE 200(1) may further include battery 712, speaker 714, microphone 728 and antenna(s) 716. User interface control 708 may include controllers or adapters configured to receive input from or provide output to a keypad, touch screen, voice interface (microphone), function keys, joystick, data glove, mouse and the like.

Instructions readable and executable by processor 706, as well as data and other elements may be stored in a storage facility such as memory 704. Memory 704 may be implemented with any combination of read only memory (ROM) modules or random access memory (RAM) modules, optionally including both volatile and nonvolatile memory. Software 718, which includes client software 702 shown in FIG. 17, may be stored within memory 704 to provide instructions to processor 706 such that when the instructions are executed, processor 706 and/or other elements of UE 200(1) are caused to perform various functions or methods such as are described herein. Software may include both applications and operating system software, and may include code segments, instructions, applets, pre-compiled code, compiled code, computer programs, program modules, engines and program logic. Computer executable instructions and data may further be stored on computer readable media including EEPROM, flash memory or other memory technology, CD-ROM, DVD or other optical disk storage, magnetic cassettes, magnetic tape, magnetic storage and the like.

Additionally, UE 200(1) is configured to receive, decode and process various types of transmissions including digital broadband broadcast transmissions that are based, for example, on the Digital Video Broadcast (DVB) standard, such as NGH, DVB-H, DVB-T2, or DVB-MHP, through service providers. In particular, UE 200(1) or one or more elements such as broadcast transceiver 722 is configured to receive, decode, and process transmission based on broadcast standards. Similarly, other digital transmission formats may alternatively be used to deliver content and information regarding available services. Additionally or alternatively, UE 200(1) may be configured to receive, decode and process transmissions through FM/AM Radio transceiver 720, WLAN transceiver 724, and telecommunications transceiver 726. Transceivers 720, 722, 724 and 726 may, alternatively, include individual transmitter and receiver components (not shown).

In at least some configurations, some or all of the functionalities of UE 200(1) and/or of other devices (e.g., computers associated with service provider 101(1) through 101(N)) may be implemented in hardware and/or firmware in addition to (or instead of) in software. For example, UE 200(1) may include one or more integrated circuits (ICs) through which one or more of the hereindescribed methods and features may be implemented. An integrated circuit may, for example, be a microprocessor that accesses programming instructions or other data stored in memory. In at least some other embodiments, one or more methods described herein are hardwired into an IC. In other words, the IC is in such cases an application specific integrated circuit (ASIC) having gates and other logic configured to perform the calculations and other operations described herein. In still other arrangements, the IC may perform some operations based on a combination of the above.

Although examples of carrying out the invention have been described, those skilled in the art will appreciate that there are numerous other variations, combinations and permutations of the above described devices and techniques that fall within the spirit and scope of the invention as set forth in the appended claims. The above description and drawings are illustrative only. The invention is not limited to the illustrated embodiments, and all embodiments of the invention need not necessarily achieve all of the advantages or purposes, or possess all characteristics, identified herein. As used in the claims, "controller" generically refers to any of one or more FPGAs, microprocessors, ICs, ASICs, other types of computational devices, or combinations thereof.

The invention claimed is:

1. A method comprising:
   mapping, with at least one processor, each of a plurality of data streams related to a specific content to a different component of a service delivering multiple versions of the specific content;

encapsulating each data stream of the plurality into a stream of packets according to a first communication protocol, wherein,
as to each of the packet streams, the packets have a value in a common field identifying the component mapped to the data stream encapsulated by the packet stream; and
forwarding the packet streams for transmission in a transmission channel, and wherein
the mapping further comprises assigning a specific value to each component for a predefined field of a packet according to a second communication protocol, the specific value distinguishing the component from other components, and
the encapsulating comprises encapsulating the packet streams according to one or more lower layer protocols without encapsulating the packet streams according to the second communication protocol.

2. The method of claim 1, wherein
the first communication protocol is a user datagram protocol, and
the common field is one of a user datagram protocol destination port field and a user datagram protocol source port field.

3. The method of claim 2, wherein the user datagram protocol source port field of the packets in each of the packet streams has a value identifying a provider of the service, and wherein the common field is the user datagram protocol destination port field.

4. The method of claim 1, wherein
the first communication protocol is a user datagram protocol,
the common field is one of a user datagram protocol destination port field and a user datagram protocol source port field,
the second communication protocol is an internet protocol, and
the predefined field is one of an internet protocol source address field and an internet protocol destination address field.

5. A non-transitory machine-readable medium storing machine-executable instructions configured to perform a method comprising:
mapping each of a plurality of data streams related to a specific content to a different component of a service delivering multiple versions of the specific content;
encapsulating each data stream of the plurality into a stream of packets according to a first communication protocol, wherein,
as to each of the packet streams, the packets have a value in a common field identifying the component mapped to the data stream encapsulated by the packet stream; and
forwarding the packet streams for transmission in a transmission channel, and wherein
the mapping further comprises assigning a specific value to each component for a predefined field of a packet according to a second communication protocol, the specific value distinguishing the component from other components, and
the encapsulating comprises encapsulating the packet streams according to one or more lower layer protocols without encapsulating the packet streams according to the second communication protocol.

6. The non-transitory machine-readable medium of claim 5, wherein
the first communication protocol is a user datagram protocol, and
the common field is one of a user datagram protocol destination port field and a user datagram protocol source port field.

7. The non-transitory machine-readable medium of claim 6, wherein the user datagram protocol source port field of the packets in each of the packet streams has a value identifying a provider of the service, and wherein the common field is the user datagram protocol destination port field.

8. The non-transitory machine-readable medium of claim 6, wherein
the first communication protocol is a user datagram protocol,
the common field is one of a user datagram protocol destination port field and a user datagram protocol source port field,
the second communication protocol is an internet protocol, and
the predefined field is one of an internet protocol source address field and an internet protocol destination address field.

9. An apparatus comprising:
at least one processor; and
at least one memory storing instructions, the at least one memory and stored instructions configured to, with the at least one processor, cause the apparatus to
map each of a plurality of data streams related to a specific content to a different component of a service delivering multiple versions of the specific content;
encapsulate each data stream of the plurality into a stream of packets according to a first communication protocol, wherein,
as to each of the packet streams, the packets have a value in a common field identifying the component mapped to the data stream encapsulated by the packet stream; and
forward the packet streams for transmission in a transmission channel and wherein
the mapping further comprises assigning a specific value to each component for a predefined field of a packet according to a second communication protocol, the specific value distinguishing the component from other components, and
the encapsulating comprises encapsulating the packet streams according to one or more lower layer protocols without encapsulating the packet streams according to the second communication protocol.

10. The apparatus of claim 9, wherein
the first communication protocol is a user datagram protocol, and
the common field is one of a user datagram protocol destination port field and a user datagram protocol source port field.

11. The apparatus of claim 10, wherein the user datagram protocol source port field of the packets in each of the packet streams has a value identifying a provider of the service, and wherein the common field is the user datagram protocol destination port field.

12. The apparatus of claim 9, wherein
the first communication protocol is a user datagram protocol,
the common field is one of a user datagram protocol destination port field and a user datagram protocol source port field, the second communication protocol is an internet protocol, and the predefined field is one of an internet protocol source address field and an internet protocol destination address field.

13. The apparatus of claim 9, wherein the apparatus is part of a system that comprises a second apparatus, the second apparatus comprising at least one controller configured, upon receiving a transmission of the service, to identify desired components of the service based on values in the common field in packets of the packet streams.

14. A method comprising:
receiving, at a user equipment device, a transmission of a service delivering multiple versions of a specific content, the service including a plurality of components, each component corresponding to a distinct data stream related to the specific content, each of the data streams encapsulated into a stream of packets according to a first communication protocol; and
identifying desired components of the service based on values in a common field in packets of the packet streams, wherein identifying desired components comprises decapsulating the first communication protocol packets of the packet streams from additional layers of encapsulation according to other communication protocols;
encapsulating first communication protocol packets from desired component packet streams according to a second communication protocol, wherein the second communication protocol is not one of the other communication protocols; and
receiving a plurality of distinct specific values, each of the specific values corresponding to a different one of the desired components, and wherein
the encapsulating first communication protocol packets comprises, as to each desired component, inserting the corresponding specific value into a predefined field of a second communication protocol packet.

15. The method of claim 14, wherein
the first communication protocol is a user datagram protocol, and
the common field is one of a user datagram protocol destination port field and a user datagram protocol source port field.

16. The method of claim 15, wherein the common field is the user datagram protocol destination port field, further comprising
determining a provider of the service based on a provider-identifying value contained in the user datagram protocol source port field of a user datagram protocol packets in the packet streams.

17. A method comprising:
receiving, at a user equipment device, a transmission of a service delivering multiple versions of a specific content, the service including a plurality of components, each component corresponding to a distinct data stream related to the specific content, each of the data streams encapsulated into a stream of packets according to a first communication protocol;
identifying desired components of the service based on values in a common field in packets of the packet streams, wherein identifying desired components comprises decapsulating the first communication protocol packets of the packet streams from additional layers of encapsulation according to other communication protocols;
encapsulating first communication protocol packets from desired component packet streams according to a second communication protocol, wherein the second communication protocol is not one of the other communication protocols, wherein
the first communication protocol is a user datagram protocol,
the common field is one of a user datagram protocol destination port field and a user datagram protocol source port field, and
the second communication protocol is an internet protocol.

18. The method of claim 17, wherein
the first communication protocol is a user datagram protocol,
the common field is one of a user datagram protocol destination port field and a user datagram protocol source port field,
the second communication protocol is an internet protocol, and
the predefined field is one of an internet protocol source address field and an internet protocol destination address field.

19. A non-transitory machine-readable medium storing machine-executable instructions for performing a method comprising:
receiving a transmission of a service delivering multiple versions of a specific content, the service including a plurality of components, each component corresponding to a distinct data stream related to the specific content, each of the data streams encapsulated into a stream of packets according to a first communication protocol;
identifying desired components of the service based on values in a common field in packets of the packet streams, wherein identifying desired components comprises decapsulating the first communication protocol packets of the packet streams from additional layers of encapsulation according to other communication protocols;
encapsulating first communication protocol packets from desired component packet streams according to a second communication protocol, wherein the second communication protocol is not one of the other communication protocols; and
receiving a plurality of distinct specific values, each of the specific values corresponding to a different one of the desired components, and wherein
the encapsulating first communication protocol packets comprises, as to each desired component, inserting the corresponding specific value into a predefined field of a second communication protocol packet.

20. The non-transitory machine-readable medium of claim 19, wherein
the first communication protocol is a user datagram protocol, and
the common field is one of a user datagram protocol destination port field and a user datagram protocol source port field.

21. The non-transitory machine-readable medium of claim 20, wherein the common field is the user datagram protocol destination port field, and storing further machine-executable instructions for performing
determining a provider of the service based on a provider-identifying value contained in the user datagram protocol source port field of a user datagram protocol packets in the packet streams.

22. A non-transitory machine-readable medium medium storing machine-executable instructions configured to perform a method comprising:
  receiving a transmission of a service delivering multiple versions of a specific content, the service including a plurality of components, each component corresponding to a distinct data stream related to the specific content, each of the data streams encapsulated into a stream of packets according to a first communication protocol;
  identifying desired components of the service based on values in a common field in packets of the packet streams, wherein identifying desired components comprises decapsulating the first communication protocol packets of the packet streams from additional layers of encapsulation according to other communication protocols; and
  encapsulating first communication protocol packets from desired component packet streams according to a second communication protocol, wherein the second communication protocol is not one of the other communication protocols, wherein
    the first communication protocol is a user datagram protocol,
    the common field is one of a user datagram protocol destination port field and a user datagram protocol source port field, and
    the second communication protocol is an internet protocol.

23. The non-transitory machine-readable medium of claim 22, wherein
  the first communication protocol is a user datagram protocol,
  the common field is one of a user datagram protocol destination port field and a user datagram protocol source port field,
  the second communication protocol is an internet protocol, and
  the predefined field is one of an internet protocol source address field and an internet protocol destination address field.

24. An apparatus comprising:
  at least one controller; and
  at least one memory storing instructions, the at least one memory and stored instructions configured, with the at least one controller, to cause the apparatus, upon receiving a transmission of a service delivering multiple versions of a specific content, the service including a plurality of components, each component corresponding to a distinct data stream related to the specific content, each of the data streams encapsulated into a stream of packets according to a first communication protocol, to
  identify desired components of the service based on values in a common field in packets of the packet streams, wherein identifying desired components comprises decapsulating the first communication protocol packets of the packet streams from additional layers of encapsulation according to other communication protocols,
  encapsulate first communication protocol packets from desired component packet streams according to a second communication protocol, wherein the second communication protocol is not one of the other communication protocols, and
  receive a plurality of distinct specific values, each of the specific values corresponding to a different one of the desired components, and wherein the encapsulating first communication protocol packets comprises, as to each desired component, inserting the corresponding specific value into a predefined field of a second communication protocol packet.

25. The apparatus of claim 24, wherein
  the first communication protocol is a user datagram protocol, and
  the common field is one of a user datagram protocol destination port field and a user datagram protocol source port field.

26. The apparatus of claim 25, wherein the common field is the user datagram protocol destination port field, and wherein the at least one controller is further configured to perform operations that include
  determining a provider of the service based on a provider-identifying value contained in the user datagram protocol source port field of a user datagram protocol packets in the packet streams.

27. An apparatus comprising:
  at least one controller; and
  at least one memory storing instructions, the at least one memory and stored instructions configured, with the at least one controller, to cause the apparatus, upon receiving a transmission of a service delivering multiple versions of a specific content, the service including a plurality of components, each component corresponding to a distinct data stream related to the specific content, each of the data streams encapsulated into a stream of packets according to a first communication protocol, to
  identify desired components of the service based on values in a common field in packets of the packet streams, wherein identifying desired components comprises decapsulating the first communication protocol packets of the packet streams from additional layers of encapsulation according to other communication protocols, and
  encapsulate first communication protocol packets from desired component packet streams according to a second communication protocol, wherein the second communication protocol is not one of the other communication protocols, wherein
    the first communication protocol is a user datagram protocol,
    the common field is one of a user datagram protocol destination port field and a user datagram protocol source port field, and
    the second communication protocol is an internet protocol.

28. The apparatus of claim 27, wherein
  the first communication protocol is a user datagram protocol,
  the common field is one of a user datagram protocol destination port field and a user datagram protocol source port field,
  the second communication protocol is an internet protocol, and
  the predefined field is one of an internet protocol source address field and an internet protocol destination address field.

* * * * *